(12) United States Patent
Tanaka et al.

(10) Patent No.: US 10,189,132 B2
(45) Date of Patent: Jan. 29, 2019

(54) CORE GRASPING APPARATUS

(71) Applicant: TOYOTA JIDOSHA KABUSHIKI KAISHA, Toyota-shi, Aichi-ken (JP)

(72) Inventors: Yoshitaka Tanaka, Miyoshi (JP); Makoto Kikuchi, Nisshin (JP); Tsubasa Ito, Nagoya (JP); Tadashi Nakahashi, Toyota (JP); Masaki Kobune, Miyoshi (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/730,149

(22) Filed: Oct. 11, 2017

(65) Prior Publication Data
US 2018/0104782 A1 Apr. 19, 2018

(30) Foreign Application Priority Data

Oct. 14, 2016 (JP) .................... 2016-202284

(51) Int. Cl.
| | | |
|---|---|---|
| B65G 49/08 | (2006.01) | |
| B65G 47/00 | (2006.01) | |
| B65G 47/74 | (2006.01) | |
| B23Q 7/16 | (2006.01) | |
| B22C 9/10 | (2006.01) | |
| B23Q 1/54 | (2006.01) | |
| B65G 47/86 | (2006.01) | |
| B22D 33/00 | (2006.01) | |
| B22D 33/02 | (2006.01) | |
| B22C 23/00 | (2006.01) | |

(52) U.S. Cl.
CPC .............. *B23Q 7/165* (2013.01); *B22C 9/108* (2013.01); *B22D 33/00* (2013.01); *B22D 33/02* (2013.01); *B23Q 1/5406* (2013.01); *B65G 47/842* (2013.01); *B65G 49/08* (2013.01); *B22C 23/00* (2013.01)

(58) Field of Classification Search
None
See application file for complete search history.

(56) References Cited

U.S. PATENT DOCUMENTS

| | | | |
|---|---|---|---|
| 4,782,567 A | * | 11/1988 | Kanaya .................... B23Q 7/04 29/33 P |
| 5,425,441 A | | 6/1995 | Landua et al. |
| 5,730,200 A | | 3/1998 | Landua |

FOREIGN PATENT DOCUMENTS

| | | |
|---|---|---|
| JP | 05-008027 A | 1/1993 |
| JP | 05-509071 A | 12/1993 |

* cited by examiner

*Primary Examiner* — Kavel Singh
(74) *Attorney, Agent, or Firm* — Sughrue Mion, PLLC

(57) ABSTRACT

A core grasping apparatus according to the present disclosure grasps a core including a core main body and a core print provided at one end of the core main body. The core grasping apparatus includes: a first holding device and a second holding device respectively including expandable and contractible first and second holding parts; and a turning suppression part configured to suppress the core from turning upon the core print being grasped by the first holding device and the second holding device. The first holding device and the second holding device grasp the core print by respectively expanding the first holding part and the second holding part, and the turning suppression part applies a force that suppresses a turning moment acting on the core to the core print.

12 Claims, 16 Drawing Sheets

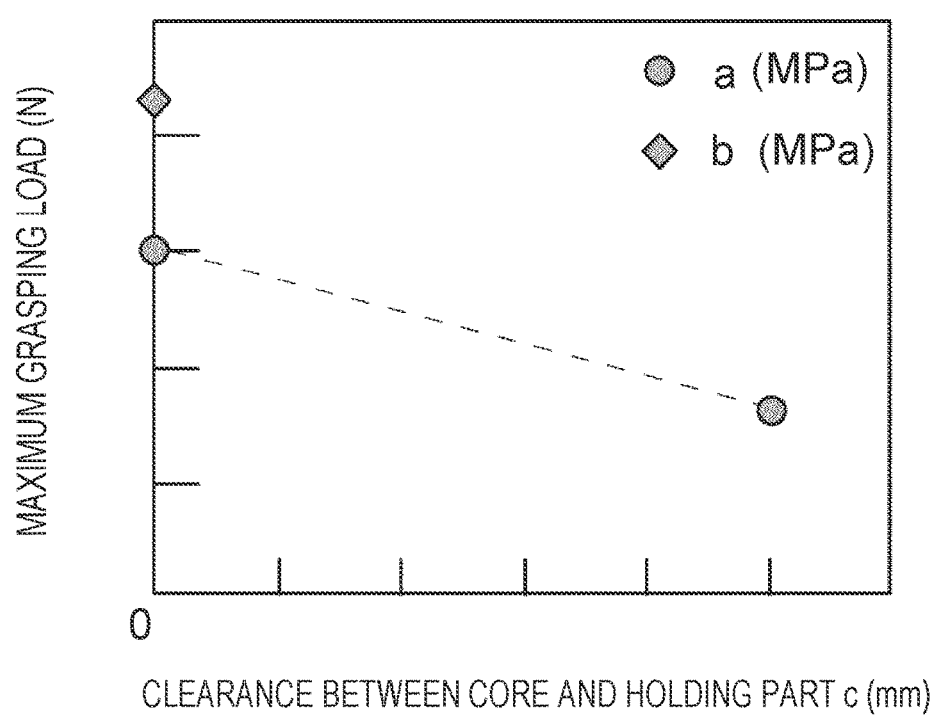

CORE GRASPING APPARATUS

INCORPORATION BY REFERENCE

The disclosure of Japanese Patent Application No. 2016-202284 filed on Oct. 14, 2016 including the specification, drawings and abstract is incorporated herein by reference in its entirety.

BACKGROUND

1. Field of the Disclosure

The present disclosure relates to a core grasping apparatus.

2. Description of Related Art

A casting core is a mold that is used to form a hollow inside a cast article to be produced. Conventionally, cores are manually placed inside dies. In recent years, however, the increasing accuracy of cast articles has made it increasingly important to dispose cores inside dies with high accuracy. Accordingly, it is more important than ever to develop a technique for disposing cores inside dies with high accuracy.

Published Japanese Translation of PCT application No. 05-509071 discloses a technique related to a conveyor that conveys casting cores.

SUMMARY

A core has a core main body and a core print that is formed at one end of the core main body. To grasp the core, the core print is grasped using a core conveyor. However, as the core print is formed at one end of the core main body, if the core print is grasped to grasp the core, there is a long distance between the center of gravity of the core and the grasping position of the core. As a result, a turning moment around the grasping position acts on the core, so that the core inclines upon being grasped.

The present disclosure provides a core grasping apparatus that can suppress a core from inclining upon being grasped.

A core grasping apparatus according to the present disclosure is a core grasping apparatus that grasps a core including a core main body and a core print provided at one end of the core main body. The core grasping apparatus includes: a first holding device including an expandable and contractible first holding part, the first holding device being configured to hold the core print by expanding the first holding part so as to bring the first holding part into contact with the core print; a second holding device including an expandable and contractible second holding part, the second holding device being configured to hold the core print by expanding the second holding part so as to bring the second holding part into contact with the core print; and a turning suppression part configured to suppress the core from turning upon the core print being held by the first holding device and the second holding device, the turning suppression part applying, to the core print, a force that suppresses a turning moment acting on the core around a straight line connecting portions of the core print at which the first holding part and the second holding part respectively come in contact with the core print.

In the core grasping apparatus according to the present disclosure, a force that suppresses the turning moment occurring on the core upon grasping the core print by expanding the first and second holding parts is applied to the core print by means of the turning suppression part. Thus, it is possible to suppress the core from inclining upon being grasped.

In the core grasping apparatus according to the present disclosure, the first holding device may hold the core print by inserting the first holding part into a first hole of the core print and expanding the first holding part, and the second holding device may hold the core print by inserting the second holding part into a second hole of the core print and expanding the second holding part.

It is possible to firmly grasp the core print by thus grasping the core print by inserting the first and second holding parts into the first and second holes formed in the core print and expanding the first and second holding parts.

In the core grasping apparatus according to the present disclosure, a third holding part that is provided in the first holding device in series with the first holding part in an opening direction of the first hole may be used as the turning suppression part. The first holding part and the third holding part may be inserted into the first hole and expanded, and the turning moment acting on the core may be suppressed as the third holding part inside the first hole comes in contact with the core print.

Thus, if the third holding part is used as the turning suppression part, a force that suppresses the turning moment occurring on the core upon grasping the core can be applied to the core print by means of the third holding part. Accordingly, it is possible to suppress the core from inclining upon being grasped. Moreover, it is possible to provide the third holding part without increasing the number of the holding devices by providing the first and third holding parts in series in the first holding device.

In the core grasping apparatus according to the present disclosure, a rod-shaped member may be used as the turning suppression part, and the rod-shaped member may apply the force that suppresses the turning moment acting on the core to the core print by coming in contact with the core print at a position separated from the straight line connecting portions of the core print at which the first holding part and the second holding part respectively come in contact with the core print.

Thus, if such the rod-shaped member is used as the turning suppression part, a force that suppresses the turning moment occurring upon grasping the core can be applied to the core print by means of the rod-shaped member. Accordingly, it is possible to suppress the core from inclining upon being grasped.

In the core grasping apparatus according to the present disclosure, as the turning suppression part, the first holding part of the first holding device may be formed in a shape elongated along the first hole.

Thus, if the first holding part is formed in a shape elongated along the first hole, a force that suppresses the turning moment occurring upon grasping the core can be applied to the core print by means of the first holding part. Accordingly, it is possible to suppress the core from inclining upon being grasped. Moreover, it is possible to apply a force that suppresses the turning moment occurring upon grasping the core to the core print without separately providing a holding device for that purpose.

In the core grasping apparatus according to the present disclosure, a third holding device including an expandable and contractible third holding part may be used as the turning suppression part, and the third holding part may apply the force that suppresses the turning moment acting on the core to the core print by coming in contact with the core print at a position separated from the straight line connecting portions of the core print at which the first holding part and the second holding part respectively come in contact with the core print.

Thus, if the third holding device having the third holding part is used as the turning suppression part, the force that suppresses the turning moment occurring upon grasping the core can be applied to the core print by means of the third holding part. Accordingly, it is possible to suppress the core from inclining upon being grasped.

In the core grasping apparatus according to the present disclosure, a fourth holding part that is provided in the second holding device in series with the second holding part in an opening direction of the second hole may be used as the turning suppression part. The second and fourth holding parts may be inserted into the second hole and expanded, and the turning moment acting on the core may be suppressed as the fourth holding part inside the second hole comes in contact with the core print.

In the core grasping apparatus according to the present disclosure, the turning suppression part may apply a force that suppresses the turning moment acting on the core to the core print by inserting the third holding part into a third hole formed in the core print and expanding the third holding part so as to come in contact with the core print.

In the core grasping apparatus according to the present disclosure, the third hole may be provided so that the distance from the core main body to the third hole is different from the distance from the core main body to the first and second holes.

In the core grasping apparatus according to the present disclosure, the turning suppression part may apply the force that suppresses the turning moment acting on the core to the core print by inserting the third holding part into the third hole and expanding the third holding part so as to come in contact with the core print, at a position different, in the opening direction of the first and second holes, from positions at which the first and second holding parts come in contact with the core print.

In the core grasping apparatus according to the present disclosure, the first and second holding devices may hold the core print by expanding the first and second holding parts so as to bring the first and second holding parts into contact with an outer peripheral surface of the core print.

In the core grasping apparatus according to the present disclosure, the turning suppression part may apply the force that suppresses the turning moment acting on the core to the core print by expanding the third holding part so as to bring the third holding part into contact with the outer peripheral surface of the core print.

The present disclosure can provide a core grasping apparatus that can suppress a core from inclining upon being grasped.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 21 is a graph showing a relation between a clearance between the core and the holding part and a maximum grasping load.

DETAILED DESCRIPTION OF EMBODIMENTS

<Embodiment 1>

Figure 1:
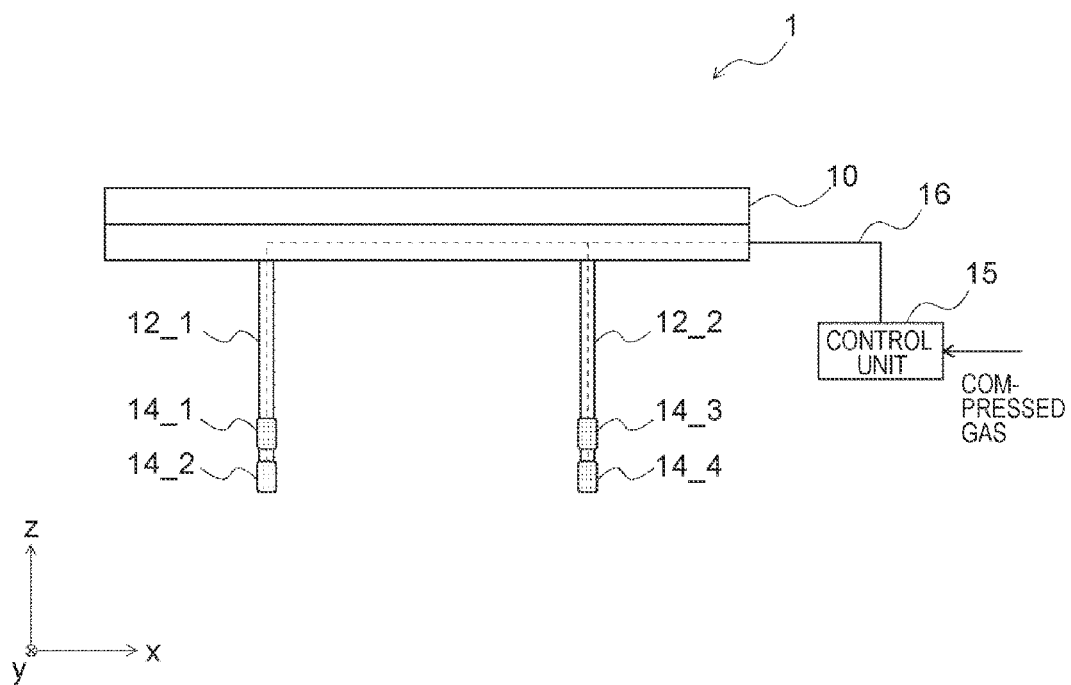
FIG. 1 is a front view showing a core grasping apparatus according to Embodiment 1.

Embodiments of the present disclosure will be described below with reference to the drawings. FIG. 1 is a front view showing a core grasping apparatus according to Embodiment 1. As shown in FIG. 1, a core grasping apparatus 1 includes a support 10, pickers (holding devices) 12_1, 12_2, a control unit 15, and a pipe 16. Each of the pickers 12_1, 12_2 is fixed to the support 10 so as to extend downward (in a minus Z-axis direction) from a lower surface of the support 10. The support 10 and the pickers 12_1, 12_2 are required to grasp and support a core, and are therefore required to have a certain level of strength. For example, the support 10 and the pickers 12_1, 12_2 can be composed of a metal material.

Holding parts 14_1, 14_2 are provided at a leading end of the picker 12_1. The holding part 14_1 and the holding part 14_2 are provided in series in a z-axis direction. Similarly, holding parts 14_3, 14_4 are provided at a leading end of the picker 12_2. The holding part 14_3 and the holding part 14_4 are provided in series in the z-axis direction. The holding parts 14_1 to 14_4 are configured to be expandable and contractible with a fluid such as a gas or a liquid (hereinafter, an example where a gas is used will be described), and, for example, can be formed by an elastic member such as rubber. For example, the holding parts 14_1 to 14_4 can be formed by rubber balloons. A gas (compressed gas) is supplied through the pipe 16 to each of the holding parts 14_1 to 14_4. The pipe passing through the support 10 and the pickers 12_1, 12_2 is indicated by dashed lines.

The control unit 15 controls expansion and contraction of the holding parts 14_1 to 14_4 of the pickers 12_1, 12_2. For example, the control unit 15 includes a solenoid valve (not shown) that switches between a state where the compressed gas (primary side) supplied to the control unit 15 is supplied to the pipe 16 and a state where the pipe 16 and an exhaust port (vent) are connected to each other, and the control unit 15 controls expansion and contraction of the holding parts 14_1 to 14_4 of the pickers 12_1, 12_2 by switching this solenoid valve.

Specifically, the control unit 15 can expand the holding parts 14_1 to 14_4 by supplying the compressed gas (primary side), supplied to the control unit 15, to the pipe 16. The control unit 15 can contract the holding parts 14_1 to 14_4 by connecting the pipe 16 to the exhaust port (vent). The holding parts 14_1 to 14_4 may be configured to expand and contract at the same timing, or may be configured to expand and contract at independent timings.

For example, to configure the holding parts 14_1 to 14_4 so as to expand and contract at the same timing, the pipes 16 connected respectively to the holding parts 14_1 to 14_4 are formed as the same system. To configure the holding parts 14_1 to 14_4 so as to expand and contract at independent timings, the pipes 16 connected respectively to the holding parts 14_1 to 14_4 are formed as separate systems. Alternatively, the pipes to the holding parts 14_1, 14_2 of the picker 12_1 may be formed as the same system, and the pipes to the holding parts 14_3, 14_4 of the picker 12_2 may be formed as the same system.

Figure 2:
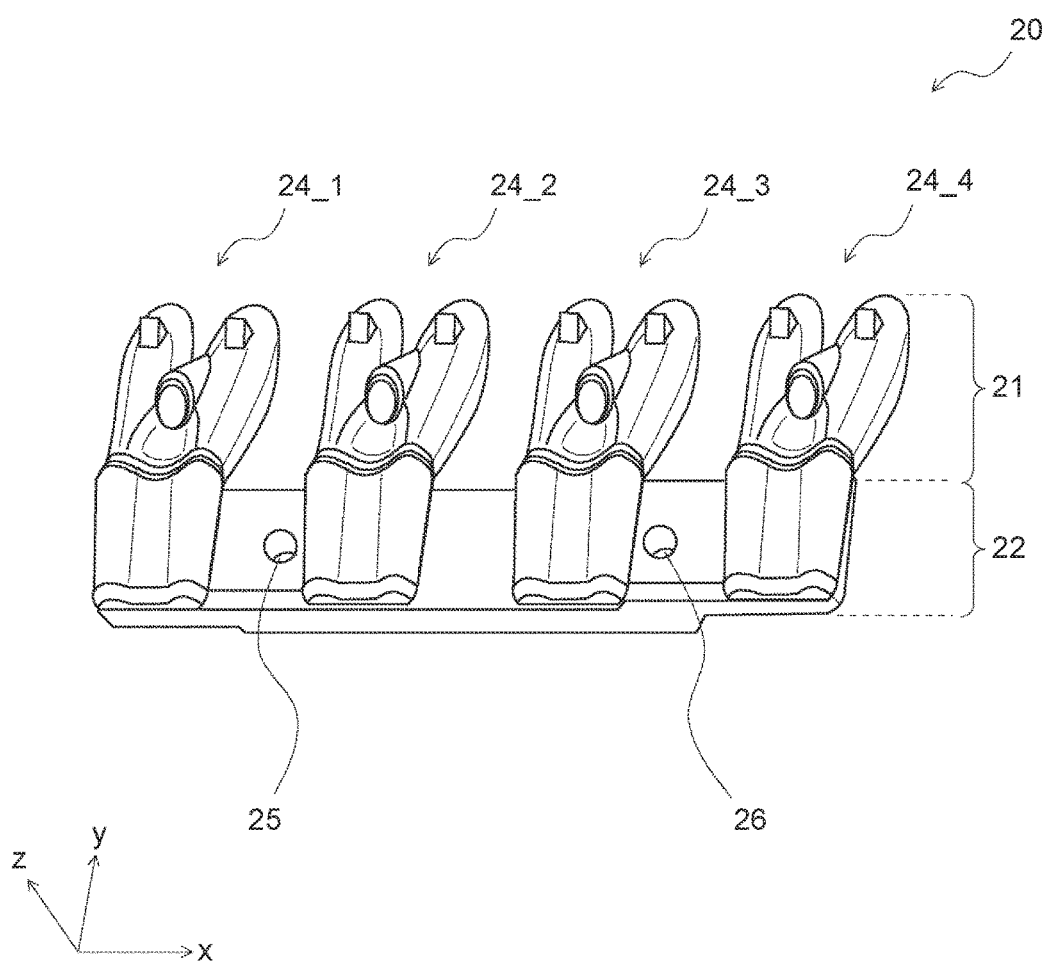
FIG. 2 is a perspective view showing an example of a core that is grasped with the core grasping apparatus according to Embodiment 1.

FIG. 2 is a perspective view showing an example of a core. As shown in FIG. 2, a core 20 has a core main body 21 and a core print 22. The core main body 21 has molds 24_1 to 24_4 formed therein to form hollows inside a cast article. The molds 24_1 to 24_4 have the same shape, and casting with the molds 24_1 to 24_4 placed inside a die of a cast article can form hollows corresponding to the molds 24_1 to 24_4 inside the cast article.

The core print 22 is a part that is provided to stabilize the core 20 when the core 20 is placed inside a die, and is formed by extending one end of the core main body 21. For example, when the core 20 is placed inside the die, the core print 22 is supported on the die. The core print 22 has holes 25, 26 formed therein that allow the core 20 to be grasped.

The holes 25, 26 are formed so as to extend in the z-axis direction. For example, the core 20 is made of sand.

Figure 3:
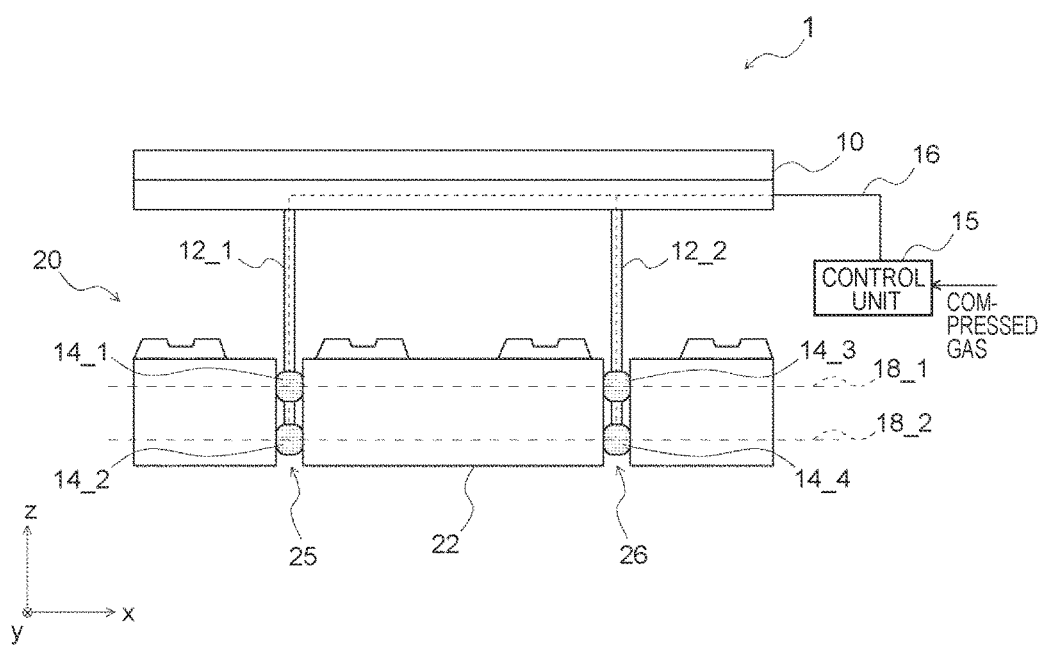
FIG. 3 is a sectional view showing a state where the core grasping apparatus according to Embodiment 1 is grasping the core.
Figure 4:
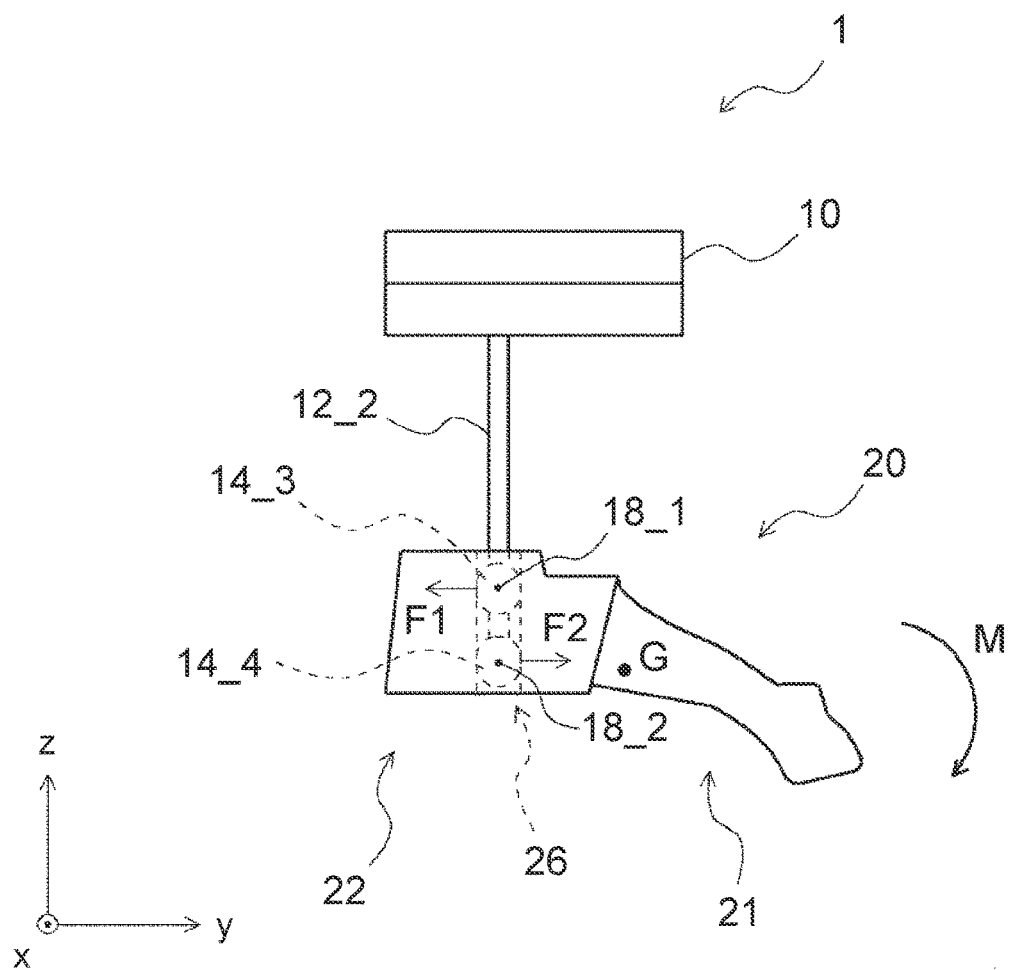
FIG. 4 is a side view showing the state where the core grasping apparatus according to Embodiment 1 is grasping the core.

FIG. 3 and FIG. 4 are a sectional view and a side view, respectively, showing a state where the core grasping apparatus 1 is grasping the core 20. The sectional view of the core 20 in FIG. 3 shows a cross-section of the core 20 shown in FIG. 2 cut along an xz-plane passing through the holes 25, 26. To grasp the core 20 with the core grasping apparatus 1, the holding parts 14_1 to 14_4 of the pickers 12_1, 12_2 are expanded, and thus the holding parts 14_1 to 14_4 are brought into contact with the core print 22 so as to grasp the core print 22.

Specifically, to grasp the core 20 with the core grasping apparatus 1, the support 10 of the core grasping apparatus 1 is moved downward (in the minus z-axis direction) by moving means (not shown). Thus, the pickers 12_1, 12_2 are moved downward, and the holding parts 14_1, 14_2 of the picker 12_1 and the holding parts 14_3, 14_4 of the picker 12_2 are inserted respectively into the holes 25, 26 formed in the core print 22 of the core 20. Thereafter, the holding parts 14_1 to 14_4 are expanded, so that the expanded holding parts 14_1 to 14_4 come in contact with inner walls of the holes 25, 26 and grasp the core 20. FIG. 3 and FIG. 4 show the state where the core grasping apparatus 1 is thus grasping the core 20.

As shown in FIG. 3 and FIG. 4, in the core grasping apparatus 1 according to this embodiment, the holding parts 14_1, 14_2 provided in series in the z-axis direction are inserted into the hole 25 to grasp the core print 22 of the core 20. Similarly, the holding parts 14_3, 14_4 provided in series in the z-axis direction are inserted into the hole 26 to grasp the core print 22 of the core 20. Thus, it is possible to suppress the core 20 from being inclined by a turning moment acting on the core 20.

Figure 5:
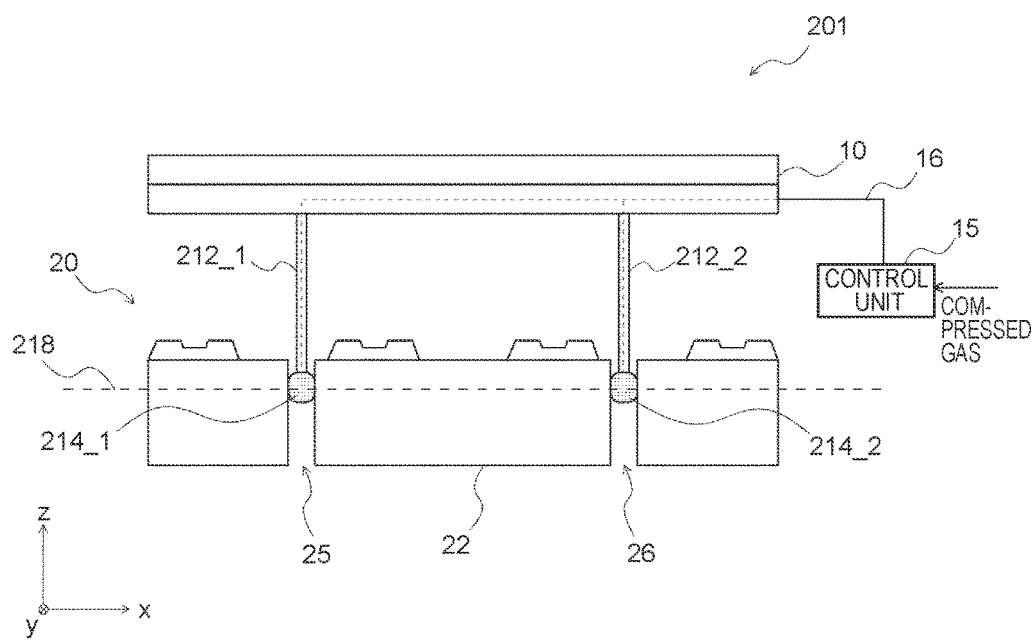
FIG. 5 is a sectional view showing a state where a core grasping apparatus according to a comparative example is grasping the core.
Figure 6:
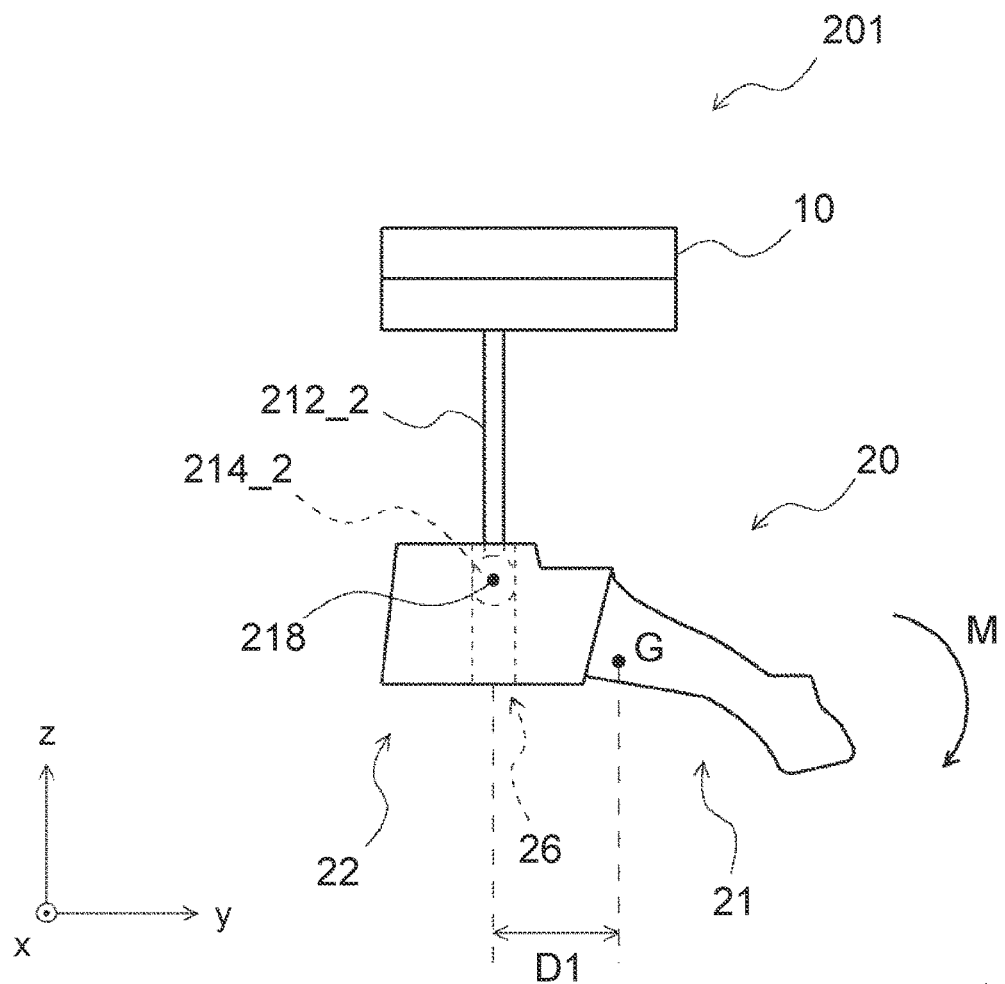
FIG. 6 is a side view showing the state where the core grasping apparatus according to the comparative example is grasping the core.

FIG. 5 and FIG. 6 are a sectional view and a side view, respectively, showing a state where a core grasping apparatus 201 according to a comparative example is grasping the core 20. As shown in FIG. 5 and FIG. 6, in the core grasping apparatus 201 according to this comparative example, a picker 212_1 has one holding part 214_1 and a picker 212_2 has one holding part 214_2. To grasp the core 20 with the core grasping apparatus 201, the holding parts 214_1, 214_2 of the pickers 212_1, 212_2 are inserted into the holes 25, 26 of the core print 22. Then, the holding parts 214_1, 214_2 are expanded, and thus the holding parts 214_1, 214_2 are brought into contact with the inner walls of the holes 25, 26 so as to grasp the core print 22.

In the core grasping apparatus 201 according to the comparative example shown in FIG. 5 and FIG. 6, the holding parts 214_1, 214_2 are located on a straight line 218. In other words, portions of the core print 22 at which the holding parts 214_1, 214_2 respectively come in contact with the core print 22 are located on the straight line 218. For example, each of the holding parts 214_1, 214_2 is in surface contact with the core print 22, and the straight line 218 passes through the portions at which this surface contact occurs.

As shown in FIG. 6, the core print 22 is formed at one end of the core main body 21. Accordingly, when the core grasping apparatus 201 according to the comparative example grasps the core print 22, there is a long distance D1 between a center of gravity G of the core 20 and grasping positions (corresponding to the holding parts 214_1, 214_2) of the core grasping apparatus 201, so that a turning moment M around the straight line 218 (indicated as an axis in FIG.

6) as a central axis acts on the core 20. If such a turning moment M acts on the core 20, the core 20 inclines upon being grasped.

Therefore, the core grasping apparatus 1 according to this embodiment is provided with a turning suppression part that suppress the core 20 from turning upon the core print 22 being grasped by the pickers 12_1, 12_2. In the core grasping apparatus 1 according to this embodiment shown in FIG. 3 and FIG. 4, the holding part 14_1 and the holding part 14_2 provided in series in the z-axis direction and the holding part 14_3 and the holding part 14_4 provided in series in the z-axis direction are used as the turning suppression part. Thus, the holding parts 14_1 to 14_4 have both the grasping function and the turning suppression function (function of the turning suppression part).

Specifically, by disposing the holding parts 14_3, 14_4 in series in the z-axis direction, it is possible to apply a force F1 that suppresses the turning moment M acting on the core 20 from the holding part 14_3 to the core print 22 as shown in FIG. 4. Moreover, it is possible to apply a force F2 that suppresses the turning moment M acting on the core 20 from the holding part 14_4 to the core print 22. Similarly, the holding parts 14_1, 14_2 can also apply a force that suppresses the turning moment M acting on the core 20 to the core print 22. Thus, the core grasping apparatus 1 according to this embodiment can suppress the core 20 from being inclined by the turning moment M acting on the core 20. For example, to look at the holding parts 14_1, 14_3, the turning moment M around a straight line 18_1 connecting the holding parts 14_1, 14_3 occurs. On the other hand, the holding parts 14_2, 14_4 apply the force F2 (see FIG. 4) that suppresses the turning moment M to the core print 22. To look at the holding parts 14_2, 14_4, the turning moment M around a straight line 18_2 connecting the holding parts 14_2, 14_4 occurs. On the other hand, the holding parts 14_1, 14_3 apply the force F1 (see FIG. 4) that suppresses the turning moment M to the core print 22. In this embodiment, the holding parts 14_1, 14_2 are provided in series in the picker 12_1 and the holding parts 14_3, 14_4 are provided in series in the picker 12_2, which allows the turning suppression part (holding part) to be provided without increasing the number of the pickers.

Figure 7:
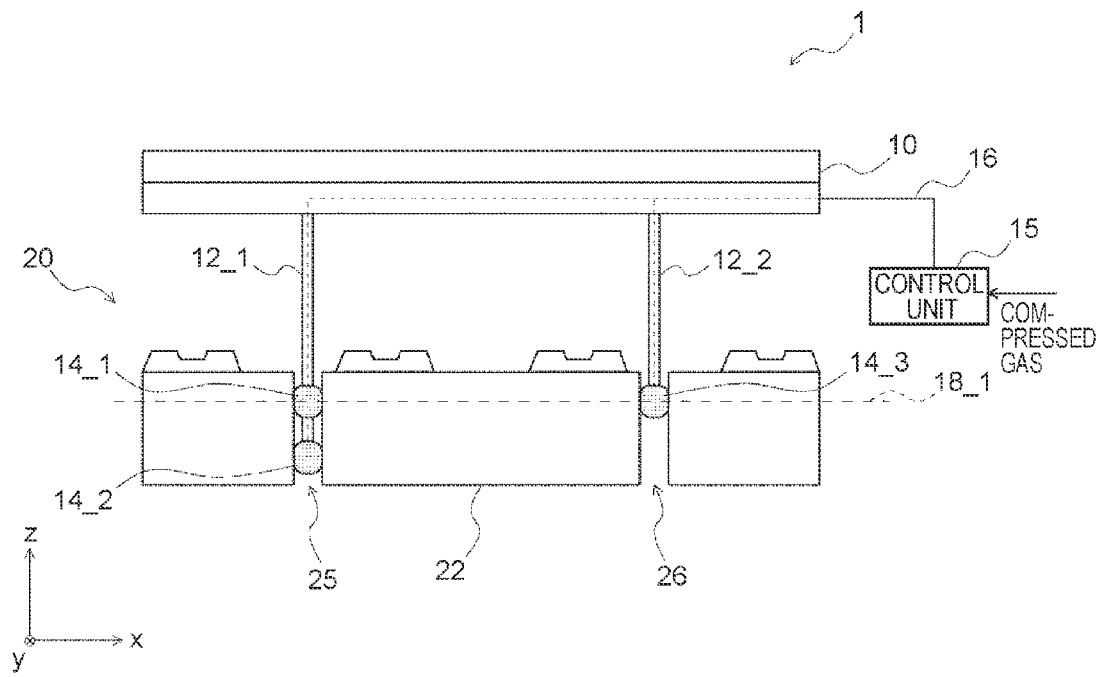
FIG. 7 is a sectional view showing another example of the state where the core grasping apparatus according to Embodiment 1 is grasping the core.

FIG. 7 is a sectional view showing another example of the state where the core grasping apparatus according to this embodiment is grasping the core. In this embodiment, only one of the picker 12_1 and the picker 12_2 may be provided with two holding parts. For example, as shown in FIG. 7, the picker 12_1 may be provided with the two holding parts 14_1, 14_2, while the picker 12_2 may be provided with one holding part 14_3. In this case, the holding part 14_2 inside the hole 25 comes in contact with the core print 22, and can thereby apply the force F2 as in FIG. 4 that suppresses the turning moment M around the straight line 18_1 acting on the core 20. In the configuration shown in FIG. 7, the holding part 14_2 functions as the turning suppression part.

The configuration in which two holding parts are provided in series at the leading end of each of the picker 12_1 and the picker 12_2 is shown in FIG. 3, and the configuration in which two holding parts are provided in series at the leading end of the picker 12_1 is shown in FIG. 7. However, in this embodiment, the number of the holding parts to be provided at the leading end of the picker is not limited to two but may be three or more.

Figure 8:
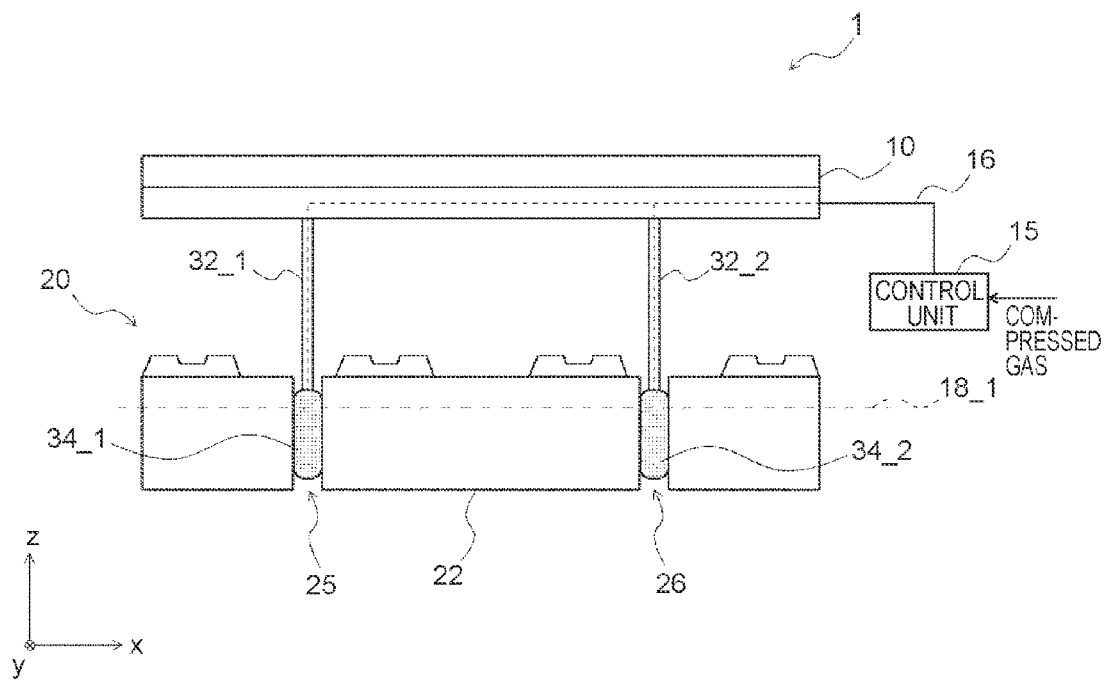
FIG. 8 is a side view showing another example of the state where the core grasping apparatus according to Embodiment 1 is grasping the core.

FIG. 8 is a sectional view showing another example of the state where the core grasping apparatus according to this embodiment is grasping the core. In this embodiment, holding parts 34_1, 34_2 provided in pickers 32_1, 32_2 may be formed in shapes elongated along the holes 25, 26. If the holding parts 34_1, 34_2 are thus formed in shapes elongated along the holes 25, 26, side walls of the expanded holding parts 34_1, 34_2 can be brought into surface contact with the inner walls of the holes 25, 26. Accordingly, it is possible to suppress the core 20 from being inclined by the turning moment acting on the core 20. In the configuration shown in FIG. 8, the holding parts 34_1, 34_2 have both the grasping function and the turning suppression function (function of the turning suppression part). For example, against the turning moment M around the straight line 18_1 connecting upper ends of the holding parts 34_1, 34_2, portions of the holding parts 34_1, 34_2 below the upper ends can apply a force that suppresses the turning moment M in the same direction as the force F2 in FIG. 4. In the case shown in FIG. 8, the holding parts 34_1, 34_2 are formed in shapes elongated along the holes 25, 26, which makes it possible to apply a force that suppresses the turning moment M to the core print 22 without increasing the number of the pickers.

The case where the two holding parts 34_1, 34_2 are formed in shapes elongated along the holes 25, 26 is shown in FIG. 8. However, in this embodiment, the holding part of one of the picker 32_1 and the picker 32_2 may be formed in a shape elongated along the hole, while the holding part of the other picker may be formed in a substantially spherical shape like that of the holding part 14_3 in FIG. 7.

In the core grasping apparatus according to this embodiment, as described with FIG. 3 etc., the expandable and contractible holding parts 14_1 to 14_4 are provided at the leading ends of the pickers 12_1, 12_2, and the holding parts 14_1 to 14_4 are expanded so as to grasp the core 20. Here, as the core 20 is formed by compacting sand, applying a large force to the core 20 can damage the core 20. However, such damage to the core 20 can be suppressed by grasping the core 20 with the expandable and contractible holding parts 14_1 to 14_4 as in the core grasping apparatus 1 according to this embodiment.

Specifically, when the core 20 is grasped with the expandable and contractible holding parts 14_1 to 14_4, the holding parts 14_1 to 14_4 can come in surface contact with the core 20, so that the pressure (contact pressure) applied to certain points of the core 20 can be reduced. Thus, damage to the core 20 can be suppressed. Moreover, it is possible to adjust the areas of contact between the core 20 and the holding parts 14_1 to 14_4 by adjusting the pressure at which the holding parts 14_1 to 14_4 are expanded, which improves the robustness of the core grasping apparatus.

Figure 9:
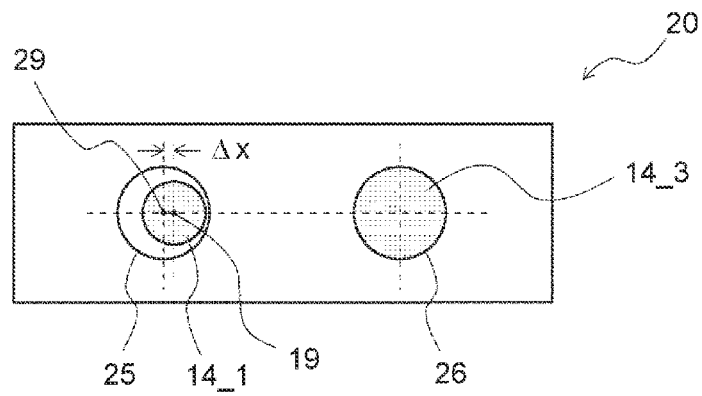
FIG. 9 is a top view illustrating a positional relation between holding parts of the core grasping apparatus and holes of the core.

For example, the dimensional tolerance in core manufacturing is approximately ±0.1 to 0.2 mm. If rubber balloons are used as the holding parts 14_1 to 14_4, these rubber balloons expand by 1 mm or more. Accordingly, the dimensional tolerance in core manufacturing can be absorbed by the expansion of the holding parts 14_1 to 14_4. Specifically, as shown in FIG. 9, even when a center position 29 of the hole 25 of the core 20 deviates from a predetermined position 19 (corresponding to a center of the holding part 14_1) by Δx (approximately ±0.1 to 0.2 mm), the holding part 14_1 upon expansion can come in contact with a side wall of the hole 25 of the core 20 and reliably grasp the core 20. FIG. 9 shows the holding part 14_1 in the middle of expansion.

If the rubber composing the holding parts 14_1 to 14_4 is too soft, the sand of the core adheres to the rubber and drops when the core is grasped next time. Moreover, the holding parts 14_1 to 14_4 are stretched in the z-axis direction by being pulled by the weight of the core upon lifting up the core. Conversely, if the rubber composing the holding parts 14_1 to 14_4 is too hard, the contact pressure applied to the core may become so high as to damage the core. It is therefore preferable that the hardness of the rubber composing the holding parts 14_1 to 14_4 be set to moderate hardness with these points in mind.

<Embodiment 2>

Figure 10:
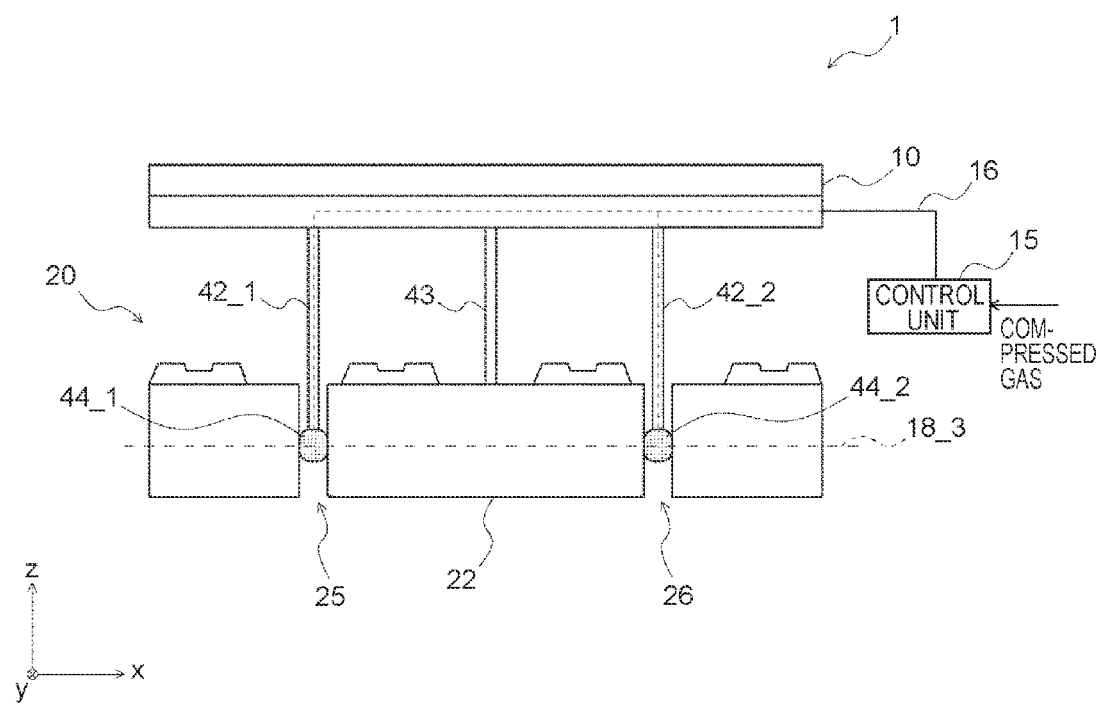
FIG. 10 is a sectional view showing a state where a core grasping apparatus according to Embodiment 2 is grasping the core.
Figure 11:
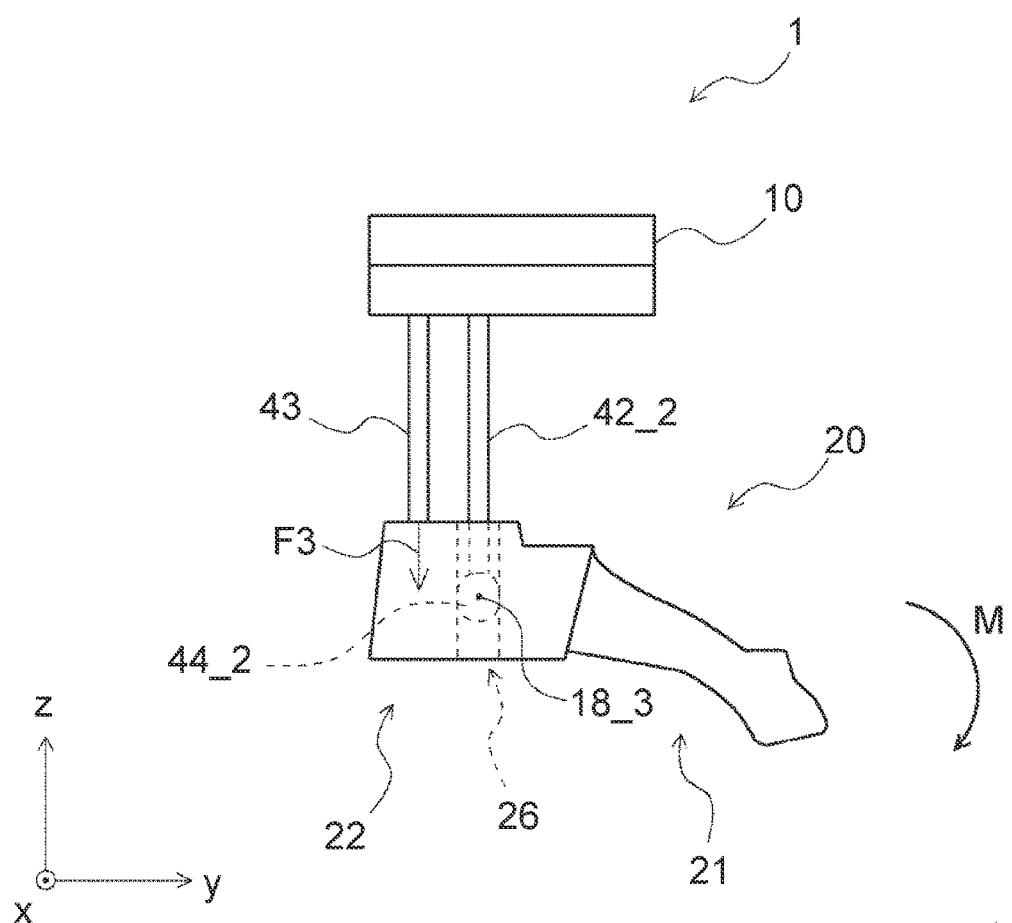
FIG. 11 is a side view showing the state where the core grasping apparatus according to Embodiment 2 is grasping the core.

Next, Embodiment 2 of the present disclosure will be described. FIG. 10 and FIG. 11 are a sectional view and a side view, respectively, showing a state where a core grasping apparatus according to Embodiment 2 is grasping the core. The core grasping apparatus according to Embodiment 2 is different from the core grasping apparatus described in Embodiment 1 in that a contact member 43 is used as the turning suppression part, that is, the contact member 43 is used to apply a force that suppresses the turning moment acting on the core 20 to the core 20. As the configuration of Embodiment 2 is otherwise the same as described in Embodiment 1, the same components will be denoted by the same reference signs while overlapping description will be omitted as appropriate.

As shown in FIG. 10 and FIG. 11, in the core grasping apparatus 1 according to this embodiment, pickers 42_1, 42_2 respectively have holding parts 44_1, 44_2. The holding parts 44_1, 44_2 of the pickers 42_1, 42_2 are inserted respectively into the holes 25, 26 and expanded, and thus the holding parts 44_1, 44_2 are brought into contact with the inner walls of the holes 25, 26 of the core print 22 of the core 20 so as to grasp the core print 22.

In this case, the holding parts 44_1, 44_2 are located on the same straight line. In other words, portions of the core print 22 at which the holding parts 44_1, 44_2 respectively come in contact with the core print 22 are located on the same straight line, so that the turning moment M around a straight line 18_3 connecting grasping positions of the holding parts 44_1, 44_2 acts on the core 20 for the reason described in Embodiment 1. Therefore, in the core grasping apparatus 1 according to this embodiment, a force F3 that suppresses the turning moment M acting on the core 20 is applied to the core print 22 by means of the contact member 43 as shown in FIG. 11. Thus, in this embodiment, the contact member 43 functions as the turning suppression part, and the contact member 43 applies the force F3 that suppresses the turning moment M acting on the core 20 by coming in contact with the core print 22 at a position separated from the straight line 18_3 connecting the holding parts 44_1, 44_2.

As shown in FIG. 10, the contact member 43 is a rod-shaped member, and is provided between the picker 42_1 and the picker 42_2 so as to extend downward (in the minus z-axis direction) from the lower surface of the support 10. As shown in FIG. 11, the contact member 43 is disposed on a minus side in a y-axis direction relative to the pickers 42_1, 42_2. The contact member 43 comes in contact with an upper surface of the core print 22, and thereby applies the force F3 that suppresses the turning moment M to the core print 22.

Thus configured, this embodiment can also provide a core grasping apparatus that can suppress a core from inclining upon being grasped.

<Embodiment 3>

Figure 12:
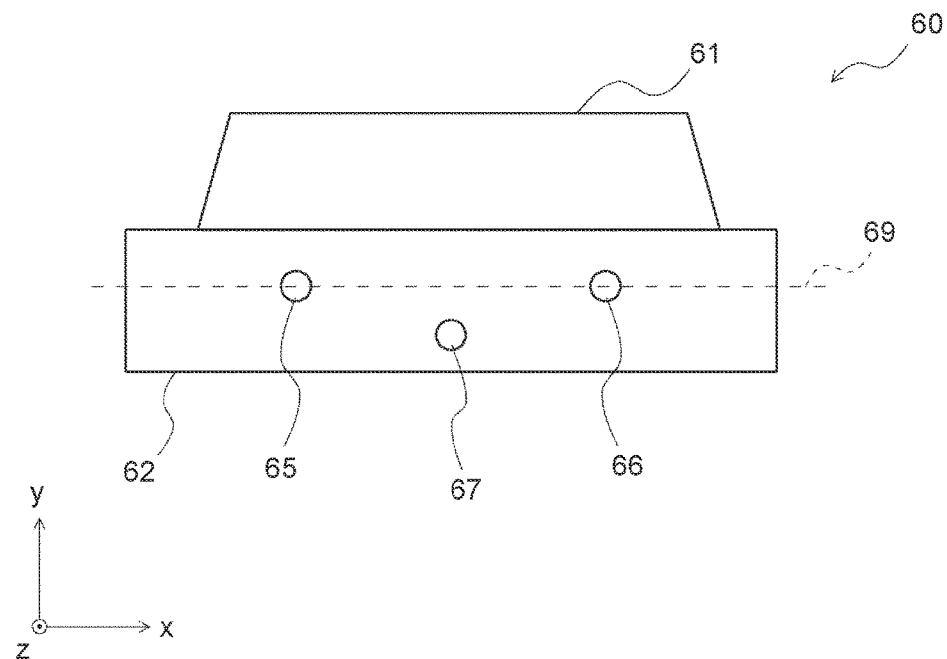
FIG. 12 is a top view of a core print of a core that is grasped with a core grasping apparatus according to Embodiment 3.

Next, Embodiment 3 of the present disclosure will be described. FIG. 12 is a top view of a core main body 61 and a core print 62 of a core 60. As shown in FIG. 12, the configuration of a core grasping apparatus according to Embodiment 3 is different from the configurations described in Embodiments 1 and 2 in that three holes 65, 66, 67 are provided in the core print 62 of the core 60. As the configuration of Embodiment 3 is otherwise the same as described in Embodiments 1 and 2, the same components will be denoted by the same reference signs while overlapping description will be omitted as appropriate.

As shown in FIG. 12, in this embodiment, the three holes 65, 66, 67 are provided in the core print 62 of the core 60. Here, the holes 65, 66 are formed so as to be located on a straight line 69 parallel to an x-axis. On the other hand, the hole 67 (third hole) is formed at a position separated from the straight line 69 connecting the hole 65 and the hole 66.

Figure 13:
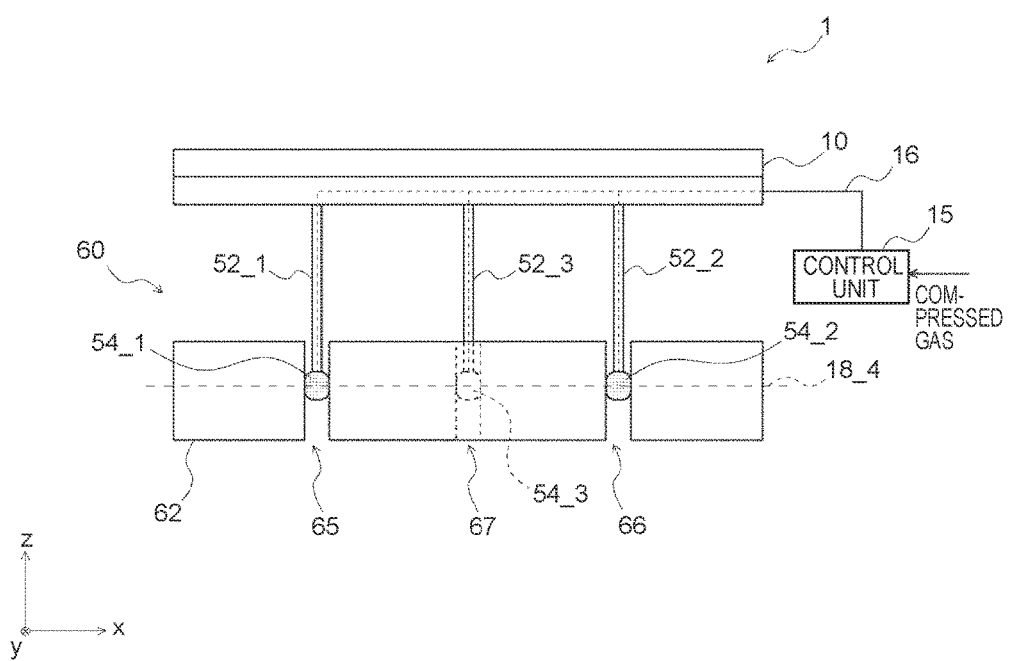
FIG. 13 is a sectional view showing a state where the core grasping apparatus according to Embodiment 3 is grasping the core.
Figure 14:
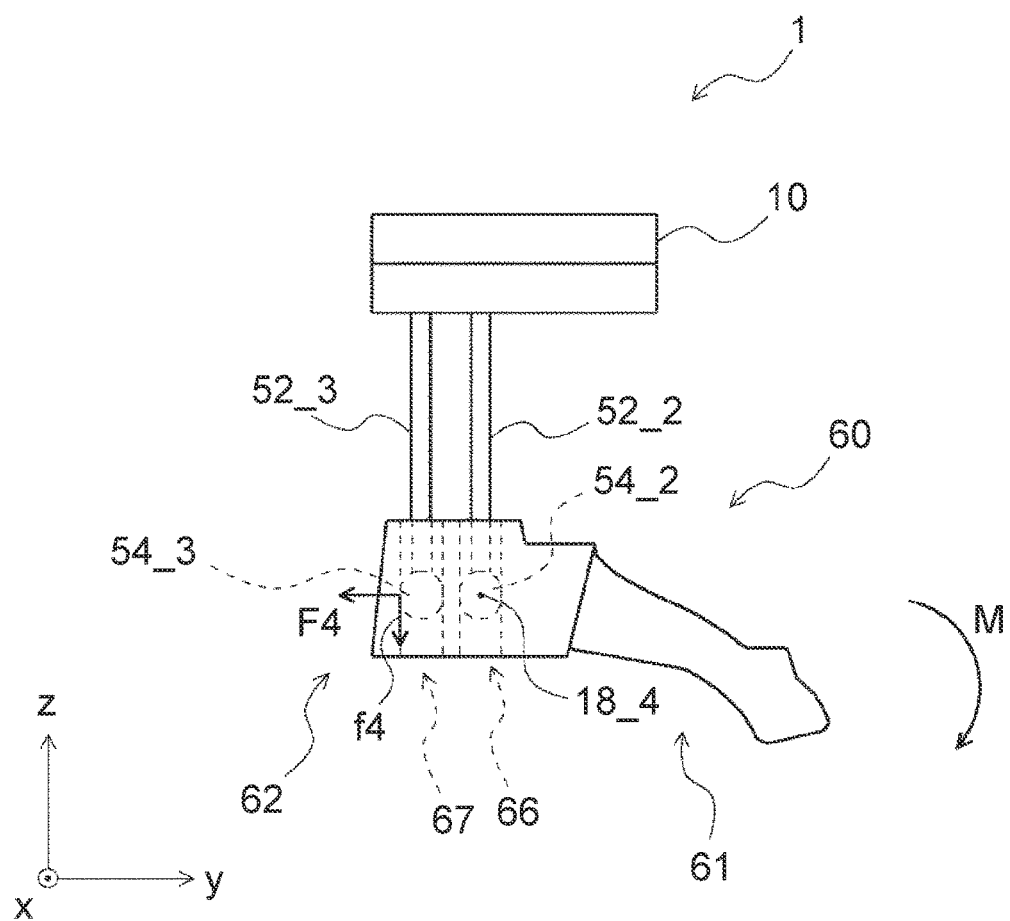
FIG. 14 is a side view showing the state where the core grasping apparatus according to Embodiment 3 is grasping the core.

FIG. 13 and FIG. 14 are a sectional view and a side view, respectively, showing a state where the core grasping apparatus 1 is grasping the core 60. The sectional view of the core 60 in FIG. 13 shows a cross-section of the core 60 shown in FIG. 12 cut along an xz-plane including the straight line 69. In FIG. 13, the hole 67 and a holding part 54_3 are indicated by dashed lines.

As shown in FIG. 13, in the core grasping apparatus 1 according to this embodiment, pickers 52_1, 52_2 respectively have holding parts 54_1, 54_2. The holding parts 54_1, 54_2 of the pickers 52_1, 52_2 are inserted respectively into the holes 65, 66 and expanded, and thus the holding parts 54_1, 54_2 are brought into contact with inner walls of the holes 65, 66 of the core print 62 of the core 60 so as to grasp the core print 62.

In this case, the holding parts 54_1, 54_2 are located on the same straight line, so that a turning moment around a straight line 18_4 connecting grasping positions of the holding parts 54_1, 54_2 acts on the core 60 for the reason described in Embodiment 1. Therefore, in the core grasping apparatus 1 according to this embodiment, the hole 67 is formed at a position separated from the straight line 69 connecting the hole 65 and the hole 66 as shown in FIG. 12. As shown in FIG. 13 and FIG. 14, the holding part 54_3 of the picker 52_3 is inserted into the hole 67 and expanded, and thus the holding part 54_3 is brought into contact with an inner wall of the hole 67 of the core print 62 so as to fix the holding part 54_3 to the hole 67 of the core print 62. In this way, the holding part 54_3 comes in contact with the core print 62 at a position separated from the straight line 18_4 connecting the holding parts 54_1, 54_2, and applies a force in the direction of a force F4 shown in FIG. 14, so that a friction force f4 (see FIG. 14) that suppresses the turning moment M acting on the core 60 can be applied to the core print 62. Thus, in this embodiment, the holding part 54_3 functions as the turning suppression part.

It is not necessary that the holding parts 54_1, 54_2, 54_3 in this embodiment are located at the same level, but the levels of these holding parts may be varied as appropriate. For example, if the holding part 54_3 in FIG. 13 and FIG. 14 is set at a higher level than the holding parts 54_1, 54_2, not only the friction force f4 but also the force F4 acts as a force that suppresses the turning moment acting on the core 60, so that inclination of the core 60 can be suppressed.

Thus configured, this embodiment can also provide a core grasping apparatus that can suppress a core from inclining upon being grasped.

<Embodiment 4>

Figure 15:
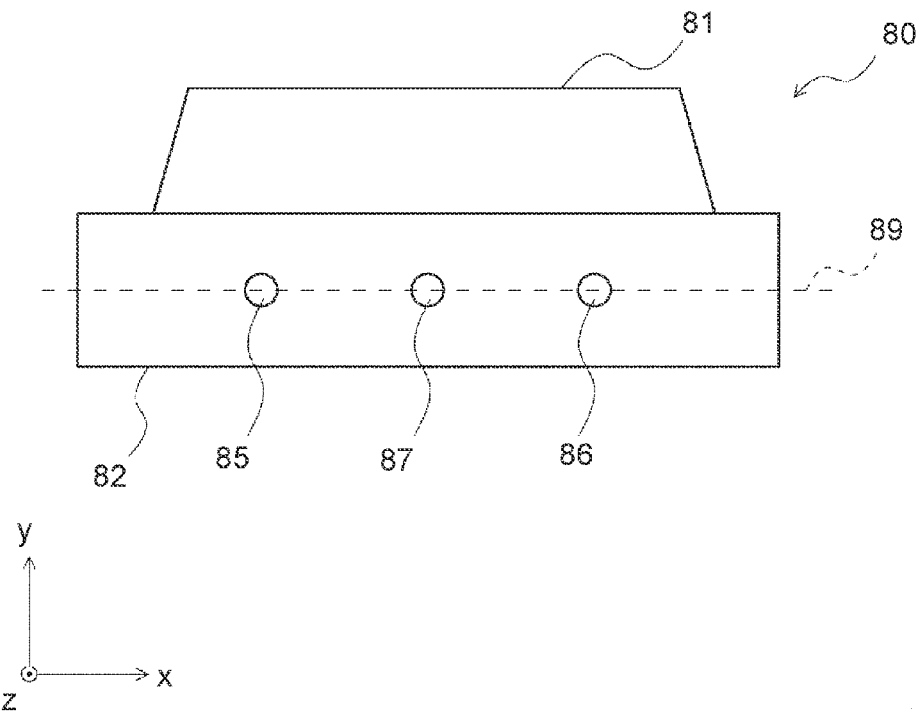
FIG. 15 is a top view of a core print of a core that is grasped with a core grasping apparatus according to Embodiment 4.
Figure 16:
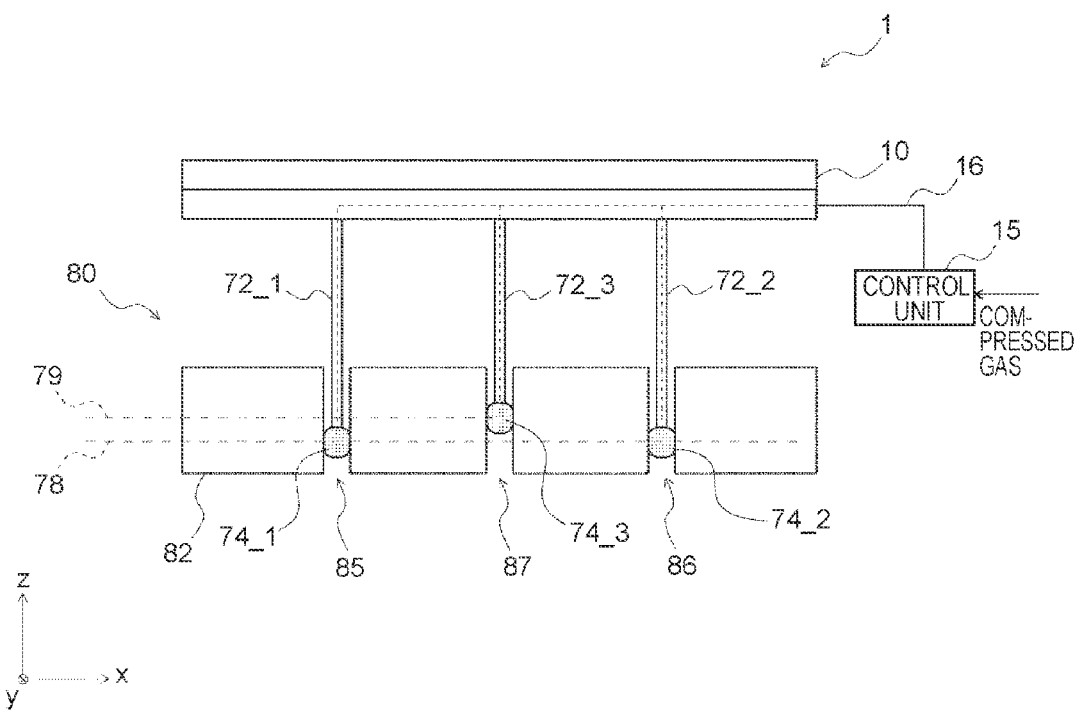
FIG. 16 is a sectional view showing a state where the core grasping apparatus according to Embodiment 4 is grasping the core.

Next, Embodiment 4 of the present disclosure will be described. FIG. 15 is a top view of a core main body 81 and a core print 82 of a core 80. FIG. 16 is a sectional view showing a state where the core grasping apparatus 1 is grasping the core 80. The configuration of the core grasping apparatus according to Embodiment 4 is different from the configurations described in Embodiments 1 to 3 in that three holes 85, 86, 87 are provided in the core print 82 of the core

80 as shown in FIG. 15, and that the position of a holding part 74_3 in the z-axis direction is shifted from the positions of holding parts 74_1, 74_2 in the z-axis direction as shown in FIG. 16. As the configuration of Embodiment 4 is otherwise the same as described in the other embodiments, the same components will be denoted by the same reference signs while overlapping description will be omitted as appropriate.

As shown in FIG. 15, in this embodiment, the three holes 85, 86, 87 are provided in the core print 82 of the core 80. The three holes 85, 86, 87 are formed so as to be located on a straight line 89 parallel to the x-axis.

As shown in FIG. 16, in the core grasping apparatus 1 according to this embodiment, pickers 72_1, 72_2 respectively have holding parts 74_1, 74_2. The holding parts 74_1, 74_2 of the pickers 72_1, 72_2 are inserted respectively into the holes 85, 86 and expanded, and thus the holding parts 74_1, 74_2 are brought into contact with inner walls of the holes 85, 86 of the core print 82 of the core 80 so as to grasp the core print 82.

In this case, the holding parts 74_1, 74_2 are located on a straight line 78, so that a turning moment around the straight line 78 connecting grasping positions of the holding parts 74_1, 74_2 acts on the core 80 for the reason described in Embodiment 1. Therefore, in the core grasping apparatus 1 according to this embodiment, as shown in FIG. 16, when the holding part 74_3 of a picker 72_3 is inserted into the hole 87 (third hole), the holding part 74_3 is disposed at a position 79 that is separated in the z-axis direction from the straight line 78 connecting the holding part 74_1 and the holding part 74_2. The holding part 74_3 is expanded and brought into contact with an inner wall of the hole 87 of the core print 82, and thus the holding part 74_3 is fixed to the hole 87 of the core print 82.

In this way, the holding part 74_3 can apply a force (a force in the direction of the force F1 shown in FIG. 4) that suppresses the turning moment acting on the core 80 to the core print 82 by coming in contact with the core print 82 at the position separated from the straight line 78 connecting the holding parts 74_1, 74_2. Thus, in this embodiment, the holding part 74_3 functions as the turning suppression part.

Thus configured, this embodiment can also provide a core grasping apparatus that can suppress a core from inclining upon being grasped.

Figure 17:
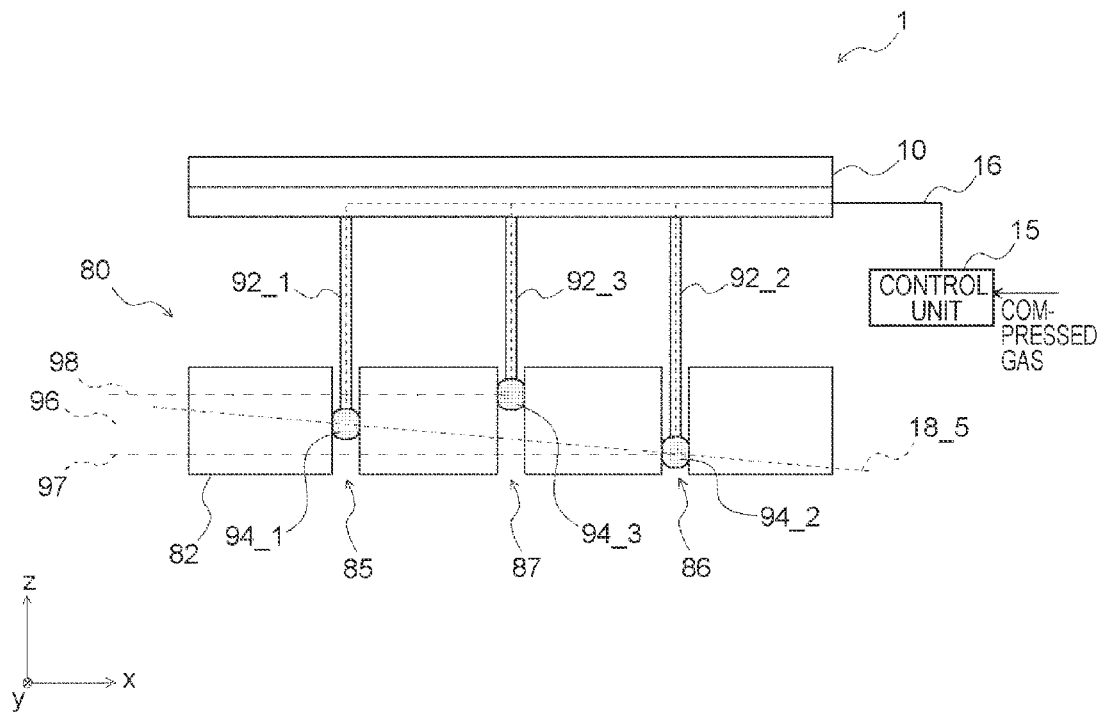
FIG. 17 is a sectional view showing another example of the state where the core grasping apparatus according to Embodiment 4 is grasping the core.

As shown in FIG. 17, in this embodiment, positions of holding parts 94_1 to 94_3 of pickers 92_1 to 92_3 in the z-axis direction may be varied from one another. Specifically, if a position 96 of the holding part 94_1 in the z-axis direction, a position 97 of the holding part 94_2 in the z-axis direction, and a position 98 of the holding part 94_3 in the z-axis direction are varied from one another, the holding parts 94_1 to 94_3 can be disposed so as not to be located on the same straight line, so that the core 80 can be suppressed from being inclined by a turning moment acting on the core 80. In the configuration shown in FIG. 17, the holding parts 94_1 to 94_3 have both the grasping function and the turning suppression function (function of the turning suppression part). For example, to look at the holding parts 94_1, 94_2, a turning moment around a straight line 18_5 connecting the holding parts 94_1, 94_2 occurs. On the other hand, the holding part 94_3 applies a force that suppresses the turning moment in the direction of the force F1 in FIG. 4. In this case, the holding part 94_3 functions as the turning suppression part.

<Embodiment 5>

Next, Embodiment 5 of the present disclosure will be described. In Embodiments 1 to 4 described above, the configurations in which the holding parts are inserted into the holes so as to grasp the core print have been described. The configuration of this embodiment is different from the configurations of the other embodiments in that pickers of the core grasping apparatus grasp a core by holding a core print of the core therebetween. As the configuration of Embodiment 5 is otherwise the same as described in the other embodiments, overlapping description will be omitted as appropriate.

Figure 18:
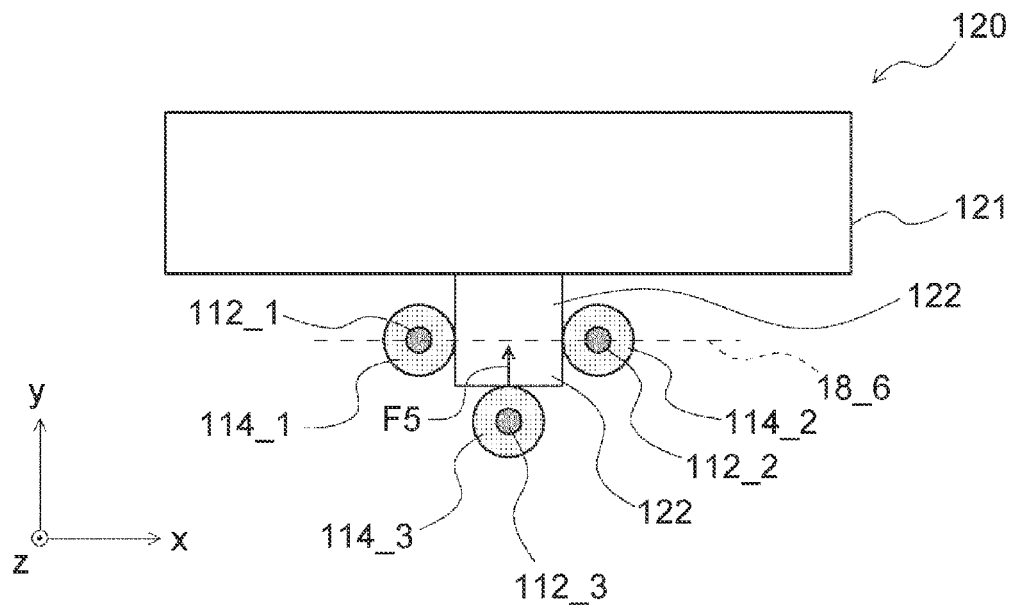
FIG. 18 is a top view showing a state where a core grasping apparatus according to Embodiment 5 is grasping a core.
Figure 19:
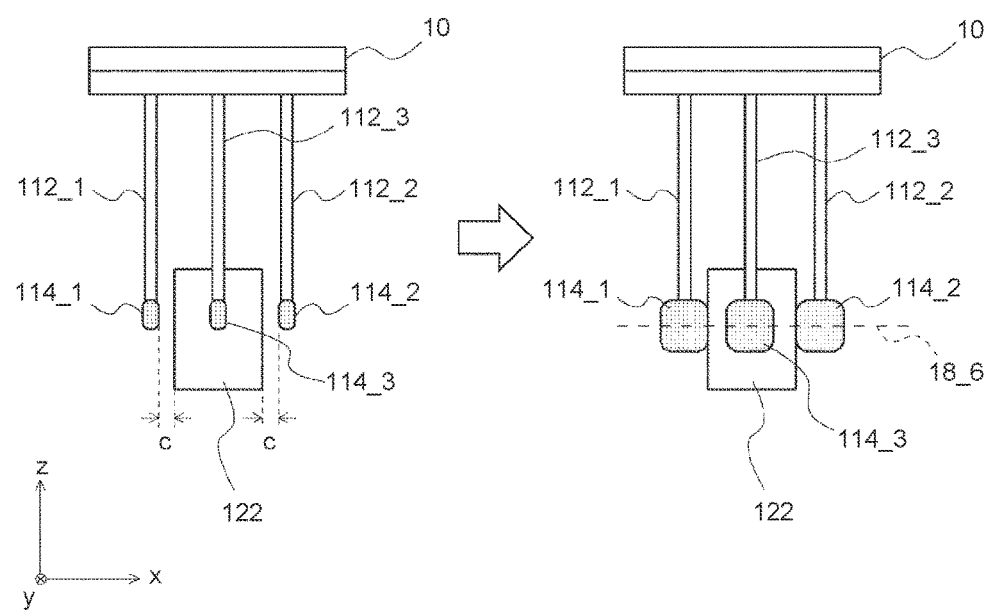
FIG. 19 is a front view illustrating an action of the core grasping apparatus according to Embodiment 5 grasping the core.
Figure 20:
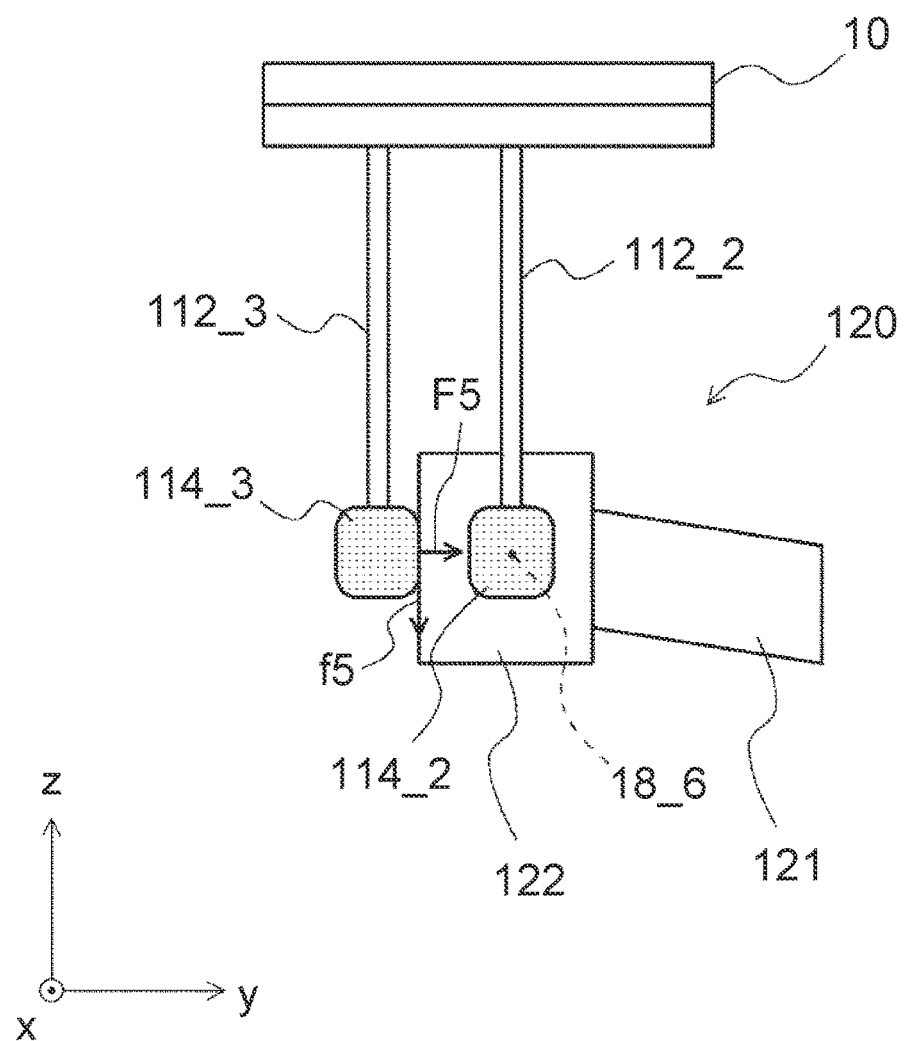
FIG. 20 is a side view showing the state where the core grasping apparatus according to Embodiment 5 is grasping the core.

FIG. 18 and FIG. 20 are a top view and a side view, respectively, showing a state where the core grasping apparatus according to this embodiment is grasping the core. FIG. 19 is a front view illustrating an action of the core grasping apparatus according to this embodiment grasping the core. As shown in FIG. 18 and FIG. 20, in this embodiment, a core print 122 of a core 120 is formed so as to protrude from a core main body 121, and the core 120 is grasped as the core print 122 is held between holding parts 114_1, 114_2 of pickers 112_1, 112_2.

Specifically, as shown in FIG. 18 and FIG. 20, the core print 122 is formed so as to extend in a minus y-axis direction from the core main body 121. The pickers 112_1, 112_2 are formed so as to extend in the z-axis direction (see FIG. 19), and the holding parts 114_1, 114_2 are provided at leading ends of the pickers 112_1, 112_2. The holding part 114_1 and the holding part 114_2 are disposed respectively on both side surfaces of the core print 122 in the x-axis direction, and the holding part 114_1 and the holding part 114_2 are expanded so as to hold the core print 122 therebetween.

In this case, the holding parts 114_1, 114_2 are located on the same straight line (see FIG. 18 and FIG. 19), so that a turning moment around a straight line 18_6 connecting grasping positions of the holding parts 114_1, 114_2 acts on the core 120 for the reason described in Embodiment 1. Therefore, in the core grasping apparatus according to this embodiment, as shown in FIG. 18 and FIG. 20, a picker 112_3 is provided on a side surface of the core print 122 on the minus side in the y-axis direction, and a holding part 114_3 provided at a leading end of the picker 112_3 comes in contact with the side surface of the core print 122. Here, a position at which the holding part 114_3 and the side surface of the core print 122 come in contact with each other is a position separated from the straight line 18_6 connecting the holding part 114_1 and the holding part 114_2. Accordingly, the holding part 114_3 applies a force F5 to the core print 122 by coming in contact with the side surface of the core print 122, so that a friction force f5 (see FIG. 20) that suppresses the turning moment acting on the core 120 can be applied to the core print 122. Thus, in this embodiment, the holding part 114_3 functions as the turning suppression part.

It is not necessary that the holding parts 114_1, 114_2, 114_3 in this embodiment are located at the same level, but the levels of these holding parts may be varied as appropriate. For example, if the holding part 114_3 in FIG. 19 and FIG. 20 is set at a lower level than the holding parts 114_2, 114_3, not only the friction force f5 but also the force F5 acts as a force that suppresses the turning moment, so that inclination of the core 120 can be suppressed.

Thus configured, this embodiment can also provide a core grasping apparatus that can suppress a core from inclining upon being grasped.

FIG. 21 is a graph showing a relation between a clearance between the core and the holding part and a maximum grasping load. As shown in FIG. 21, the maximum grasping load (i.e., the load of the core as a whole) imposed on each of the holding parts 114_1, 114_2 as it grasps and lifts up the core print 122 varies according to a clearance c between the holding parts 114_1, 114_2 in a contracted state and the core print 122 (see the view on the left in FIG. 19).

Specifically, as indicated by the data in the graph of FIG. 21 representing the case where the holding parts 114_1, 114_2 are expanded at a pressure a (MPa), the maximum grasping load decreases as the clearance c between the holding parts 114_1, 114_2 in the contracted state and the core print 122 increases. Accordingly, reducing the clearance c between the holding parts 114_1, 114_2 and the core print 122 shown in FIG. 19 can increase the maximum grasping load.

Conversely, if the clearance c between the holding parts 114_1, 114_2 and the core print 122 shown in FIG. 19 is too small, positional accuracy is required in disposing the holding parts 114_1, 114_2 at both ends of the core print 122. That is, due to the small clearance c between the holding parts 114_1, 114_2 and the core print 122, it is necessary to control the positions of the holding parts 114_1, 114_2 with high accuracy so that the holding parts 114_1, 114_2 do not hit the core print 122 while being disposed.

In this embodiment, therefore, the accuracy with which the positions of the holding parts 114_1, 114_2 are controlled and the maximum grasping load (i.e., the load of the core as a whole) need to be taken into account in determining the clearance c between the holding parts 114_1, 114_2 and the core print 122. As shown in the graph of FIG. 21, the maximum grasping load in the case where the holding parts 114_1, 114_2 are expanded at a pressure b (MPa) is larger than that in the case where the holding parts 114_1, 114_2 are expanded at the pressure a (MPa) (b>a). Thus, expanding the holding parts 114_1, 114_2 at a higher pressure can increase the maximum load of the core to be grasped.

While the present disclosure has been described above on the basis of the embodiments, it should be understood that the disclosure is not limited to the configurations of these embodiments but includes any modifications, adjustments, and combinations that can be conceived of by those skilled in the art.

What is claimed is:
1. A core grasping apparatus that grasps a core including a core main body and a core print provided at one end of the core main body, the core grasping apparatus comprising:
a first holding device including an inflatable and deflatable first holding part, the first holding device being configured to hold the core print by inflating the first holding part so as to bring the first holding part into contact with the core print;
a second holding device including an inflatable and deflatable second holding part, the second holding device being configured to hold the core print by inflating the second holding part so as to bring the second holding part into contact with the core print; and
a turning suppression part configured to suppress the core from turning upon the core print being held by the first holding device and the second holding device, the turning suppression part applying, to the core print, a force that suppresses a turning moment acting on the core around a straight line connecting portions of the core print at which the first holding part and the second holding part respectively come in contact with the core print, wherein
the first holding device holds the core print by inserting the first holding part into a first hole of the core print and inflating the first holding part,
the second holding device holds the core print by inserting the second holding part into a second hole of the core print and inflating the second holding part,
a third holding part that is provided in the first holding device in series with the first holding part in an opening direction of the first hole is used as the turning suppression part, and
the first holding part and the third holding part are inserted into the first hole and inflated, and the turning moment acting on the core is suppressed as the third holding part inside the first hole comes in contact with the core print.

2. The core grasping apparatus according to claim 1, wherein
a rod-shaped member is used as the turning suppression part, and
the rod-shaped member applies the force that suppresses the turning moment acting on the core to the core print by coming in contact with the core print at a position separated from the straight line connecting portions of the core print at which the first holding part and the second holding part respectively come in contact with the core print.

3. The core grasping apparatus according to claim 1, wherein, as the turning suppression part, the first holding part of the first holding device is formed in a shape elongated along the first hole.

4. The core grasping apparatus according to claim 1, wherein
a third holding device including an inflatable and deflatable third holding part is used as the turning suppression part, and
the third holding part applies the force that suppresses the turning moment acting on the core to the core print by coming in contact with the core print at a position separated from the straight line connecting portions of the core print at which the first holding part and the second holding part respectively come in contact with the core print.

5. The core grasping apparatus according to claim 4, wherein the turning suppression part applies the force that suppresses the turning moment acting on the core to the core print by inserting the third holding part into a third hole formed in the core print and inflating the third holding part so as to come in contact with the core print.

6. The core grasping apparatus according to claim 5, wherein the third hole is provided so that a distance from the core main body to the third hole is different from a distance from the core main body to the first and second holes.

7. The core grasping apparatus according to claim 5, wherein the turning suppression part applies the force that suppresses the turning moment acting on the core to the core print by inserting the third holding part into the third hole and inflating the third holding part so as to come in contact with the core print, at a position different, in the opening direction of the first and second holes, from positions at which the first and second holding parts come in contact with the core print.

8. The core grasping apparatus according to claim 4, wherein the first and second holding devices hold the core print by inflating the first and second holding parts so as to bring the first and second holding parts into contact with an outer peripheral surface of the core print.

9. The core grasping apparatus according to claim 8, wherein the turning suppression part applies the force that suppresses the turning moment acting on the core to the core print by inflating the third holding part so as to bring the third holding part into contact with the outer peripheral surface of the core print.

10. The core grasping apparatus according to claim 1, wherein
a fourth holding part that is provided in the second holding device in series with the second holding part in an opening direction of the second hole is used as the turning suppression part, and
the second and fourth holding parts are inserted into the second hole and inflated, and the turning moment acting on the core is suppressed as the fourth holding part inside the second hole comes in contact with the core print.

11. A core grasping apparatus that grasps a core including a core main body and a core print provided at one end of the core main body, the core grasping apparatus comprising:
a first holding device including an inflatable and deflatable first holding part, the first holding device being configured to hold the core print by inflating the first holding part so as to bring the first holding part into contact with the core print;
a second holding device including an inflatable and deflatable second holding part, the second holding device being configured to hold the core print by inflating the second holding part so as to bring the second holding part into contact with the core print; and
a turning suppression part configured to suppress the core from turning upon the core print being held by the first holding device and the second holding device, the turning suppression part applying, to the core print, a force that suppresses a turning moment acting on the core around a straight line connecting portions of the core print at which the first holding part and the second holding part respectively come in contact with the core print, wherein
a rod-shaped member is used as the turning suppression part, and
the rod-shaped member applies the force that suppresses the turning moment acting on the core to the core print by coming in contact with the core print at a position separated from the straight line connecting portions of the core print at which the first holding part and the second holding part respectively come in contact with the core print.

12. A core grasping apparatus that grasps a core including a core main body and a core print provided at one end of the core main body, the core grasping apparatus comprising:
a first holding device including an inflatable and deflatable first holding part, the first holding device being configured to hold the core print by inflating the first holding part so as to bring the first holding part into contact with the core print;
a second holding device including an inflatable and deflatable second holding part, the second holding device being configured to hold the core print by inflating the second holding part so as to bring the second holding part into contact with the core print; and
a turning suppression part configured to suppress the core from turning upon the core print being held by the first holding device and the second holding device, the turning suppression part applying, to the core print, a force that suppresses a turning moment acting on the core around a straight line connecting portions of the core print at which the first holding part and the second holding part respectively come in contact with the core print, wherein
a third holding device including an inflatable and deflatable third holding part is used as the turning suppression part, and
the third holding part applies the force that suppresses the turning moment acting on the core to the core print by coming in contact with the core print at a position separated from the straight line connecting portions of the core print at which the first holding part and the second holding part respectively come in contact with the core print.

\* \* \* \* \*